(12) United States Patent
Kleman et al.

(10) Patent No.: US 10,480,985 B2
(45) Date of Patent: Nov. 19, 2019

(54) EXPLOSION PROOF RADAR LEVEL GAUGE

(71) Applicant: Rosemount Tank Radar AB, Mölnlycke (SE)

(72) Inventors: Mikael Kleman, Ulrika (SE); Leif Nilsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 244 days.

(21) Appl. No.: 15/720,031

(22) Filed: Sep. 29, 2017

(65) Prior Publication Data

US 2019/0101429 A1    Apr. 4, 2019

(51) Int. Cl.
| | |
|---|---|
| *G01F 23/284* | (2006.01) |
| *H01Q 1/22* | (2006.01) |
| *G01S 13/88* | (2006.01) |
| *G01S 13/08* | (2006.01) |
| *G01S 7/00* | (2006.01) |
| *G01S 7/02* | (2006.01) |

(Continued)

(52) U.S. Cl.
CPC .......... *G01F 23/284* (2013.01); *G01S 13/88* (2013.01); *H01Q 1/225* (2013.01); *G01S 7/003* (2013.01); *G01S 7/032* (2013.01); *G01S 13/08* (2013.01); *G01S 2007/027* (2013.01)

(58) Field of Classification Search
None
See application file for complete search history.

(56) References Cited

U.S. PATENT DOCUMENTS

| 3,277,711 A | 10/1966 | Roberge |
| 5,672,975 A * | 9/1997 | Kielb .................... G01F 23/284 |
| | | 324/644 |
| 5,877,663 A | 3/1999 | Palen et al. |

(Continued)

FOREIGN PATENT DOCUMENTS

GB          793 953          4/1958

OTHER PUBLICATIONS

Office Action from U.S. Appl. No. 15/204,177, dated Jan. 30, 2019.
(Continued)

*Primary Examiner* — Bernarr E Gregory
(74) *Attorney, Agent, or Firm* — Westman, Champlin & Koehler, P.A.

(57) ABSTRACT

A radar level gauge comprising a housing enclosing a compartment providing explosion proof protection, RLG circuitry located inside compartment, which circuitry is incompatible with intrinsic safety requirements, and a signal propagation device located outside the compartment. The housing has an explosion proof first signal passage providing a transmission line for the microwave transmit signal, and an explosion proof second signal passage in providing a two-wire interface for electrically conductively connecting the radar level gauge to an intrinsically safe system located externally of the radar level gauge. Further, the RLG includes an electrical barrier connected between the RLG circuitry and the two-wire interface, the electrical barrier preventing energy and/or thermal energy in the RLG circuitry from compromising the intrinsic safety of an intrinsically safe system connected to the two-wire interface.

17 Claims, 5 Drawing Sheets

(51) Int. Cl.
*G01S 7/03* (2006.01)
*G01S 13/00* (2006.01)

(56) References Cited

U.S. PATENT DOCUMENTS

| | | | | |
|---|---|---|---|---|
| 5,955,684 | A * | 9/1999 | Gravel | G01F 23/284 |
| | | | | 73/866.5 |
| 6,062,095 | A * | 5/2000 | Mulrooney | G01F 23/284 |
| | | | | 73/204.22 |
| 6,148,681 | A * | 11/2000 | Gravel | G01F 23/284 |
| | | | | 73/866.5 |
| 6,320,532 | B1 * | 11/2001 | Diede | G01F 23/284 |
| | | | | 342/124 |
| 6,504,489 | B1 * | 1/2003 | Westfield | G08C 19/02 |
| | | | | 340/870.3 |
| 6,750,808 | B2 * | 6/2004 | Faust | G01F 23/284 |
| | | | | 342/124 |
| 7,036,381 | B2 * | 5/2006 | Broden | G01L 19/0645 |
| | | | | 73/708 |
| 7,308,825 | B2 * | 12/2007 | Hagg | G01F 23/284 |
| | | | | 73/290 R |
| 7,372,397 | B2 * | 5/2008 | Nilsson | G01F 23/284 |
| | | | | 324/644 |
| 7,773,715 | B2 * | 8/2010 | Westfield | G01D 3/08 |
| | | | | 340/870.16 |
| 8,531,253 | B2 | 9/2013 | Ahn et al. | |
| 9,377,340 | B2 * | 6/2016 | Hagg | G01F 23/284 |
| 10,234,321 | B2 | 3/2019 | Ohlsson et al. | |
| 2004/0066588 | A1 * | 4/2004 | Flasza | H01Q 1/002 |
| | | | | 361/9 |
| 2004/0085240 | A1 | 5/2004 | Faust | |
| 2004/0100281 | A1 | 5/2004 | Nilsson | |
| 2005/0083229 | A1 | 4/2005 | Edvardsson et al. | |
| 2007/0020998 | A1 | 1/2007 | Edvardsson | |
| 2008/0074309 | A1 * | 3/2008 | Nilsson | G01F 23/284 |
| | | | | 342/124 |
| 2008/0303611 | A1 | 12/2008 | Michalski et al. | |
| 2009/0085794 | A1 | 4/2009 | Edvardsson et al. | |
| 2009/0211808 | A1 * | 8/2009 | Falk | H01R 13/5216 |
| | | | | 174/667 |
| 2009/0322593 | A1 * | 12/2009 | Hall | G01F 23/284 |
| | | | | 342/124 |
| 2011/0093129 | A1 | 4/2011 | Nilsson et al. | |
| 2012/0198931 | A1 * | 8/2012 | Schulze | G01F 15/14 |
| | | | | 73/431 |
| 2012/0206290 | A1 | 8/2012 | Wegemann et al. | |
| 2014/0235088 | A1 * | 8/2014 | Fawcett | H01R 13/53 |
| | | | | 439/349 |
| 2015/0253176 | A1 | 9/2015 | Jirskog et al. | |
| 2016/0146924 | A1 | 5/2016 | Williams | |
| 2016/0262254 | A1 * | 9/2016 | Meijer | G01F 23/284 |
| 2018/0010948 | A1 * | 1/2018 | Edvardsson | G01F 23/284 |
| 2018/0010949 | A1 * | 1/2018 | Ohlsson | G01F 23/284 |

OTHER PUBLICATIONS

AN9003—A User's Guide to Intrinsic Safety, Cooper Crouse-Hinds, retrieved Sep. 25, 2012.
U.S. Appl. No. 15/204,177, filed Jul. 7, 2016.
Office Action from U.S. Appl. No. 15/204,177, dated Aug. 14, 2018.
Communication from European Patent Application No. 18197017.9, dated Feb. 14, 2019.
Notification of Transmittal of the International Search Report and the Written Opinion of the international Searching Authority from PCT/EP2017/064081, dated Sep. 21, 2017.

* cited by examiner

EXPLOSION PROOF RADAR LEVEL GAUGE

FIELD OF THE INVENTION

The present invention relates to a radar level gauge with circuitry arrange in a housing enclosing a compartment providing explosion proof protection.

BACKGROUND OF THE INVENTION

A radar level gauge (RLG) is suitably used for making measurements of a filling level of products such as process fluids, granular compounds and other materials contained in a tank.

An example of such a radar level gauge can include transceiver circuitry for transmitting and receiving microwaves, a signal propagating device arranged to direct microwaves towards the surface and to return microwaves reflected by the surface to the transceiver, and processing circuitry adapted to determine the filling level based on a relation between microwaves transmitted and received by the transceiver.

The signal propagating device may be a directional antenna, adapted to emit free propagating electromagnetic waves into the tank and receive a reflection of those waves. Such an RLG is sometimes referred to as a non-contact RLG. Alternatively, the signal propagation device may be a transmission line probe extending into the tank and beyond the product surface. Such an RLG is sometimes referred to as a guided wave radar (GWR) level gauge.

In some applications, an RLG is used in an environment where there is a risk for fire and explosions. In such applications, the RLG must be designed to avoid igniting explosions, and for this there are essentially two different approaches, with associated norms and safety regulations.

According to a first approach, the circuitry of the RLG is designed to be "intrinsically safe" (IS), i.e. available electrical and thermal energy in the circuitry is restricted such that ignition of a hazardous atmosphere (explosive gas or dust) cannot occur, even under worst case conditions. For details of the IS concept, reference is made to "AN9003—A Users Guide to Intrinsic Safety", Cooper Crouse Hinds, Retrieved 25 Sep. 2012.

According to another approach, the RLG is "explosion proof" (sometimes referred to as "flame proof" or "ignition proof"), indicating that regardless of power supply, any explosion in the RLG circuitry will be contained in the RLG and not cause any hazard. An example of an international standard for explosion proof protection is IEC 60079-1.

A drawback with an explosion proof RLG is that it typically cannot be connected to an intrinsically safe power supply without compromising the safety requirements. In other words, in order to be compatible with an IS environment, the RLG needs to be intrinsically safe.

On the other hand, intrinsically safe circuitry of an RLG needs to be connected to an IS power supply. In order to enable connection of an intrinsically safe circuitry to a non-IS power supply, it is typically provided with a so called IS barrier, i.e. a barrier that limits current and power that is supplied to the circuitry. Intrinsically safe circuitry with such an IS barrier can thus maintain its intrinsically safety regardless of power supply.

Conventionally, most suppliers of RLG equipment have chosen this latter approach, and most RLGs are today intrinsically safe. While providing the required versatility, a significant drawback with this approach is that any redesign of the circuitry need to be certified under the relevant standard (e.g. IEC 60079-11).

Therefore, it would be desirable to relax the IS requirements and instead have an explosion proof RLG (e.g. according to IEC 60079-1) which can be connected to an IS power supply without compromising safety regulations.

GENERAL DISCLOSURE OF THE INVENTION

It is an object of the present invention to provide an explosion proof RLG which can be connected to an IS power supply while complying with IS regulations.

According to a first aspect of the present invention, this and other objects are achieved by a radar level gauge for determining the filling level of product in a tank, the gauge comprising a housing with a housing wall enclosing a compartment providing explosion proof protection, RLG circuitry located inside compartment, the circuitry in use having an available electrical and/or thermal energy incompatible with intrinsic safety requirements, and a signal propagation device located outside the compartment. The housing has an explosion proof first signal passage in the housing wall, the first signal passage providing a transmission line for the microwave transmit signal between the RLG circuitry and the signal propagation device, an explosion proof second signal passage in the housing wall, the second signal passage providing a two-wire interface for electrically conductively connecting the radar level gauge to an intrinsically safe system located externally of the radar level gauge, to provide at least one of: communication between the radar level gauge and the intrinsically safe system, and power supply to the RLG circuitry. Further, the RLG includes an electrical barrier connected between the RLG circuitry and the two-wire interface, the electrical barrier preventing energy and/or thermal energy in the RLG circuitry from compromising the intrinsic safety of an intrinsically safe system connected to the two-wire interface.

The fact that the RLG circuitry is "incompatible with IS requirements" essentially means that available electrical and thermal energy in the circuitry is restricted such that ignition of a hazardous atmosphere cannot occur. For example, a capacitance connected to a voltage which may exceed a certain limit, may in combination make an electrical energy available which could ignite an explosive atmosphere. Similarly, a thermal resistance connected to an electrical power which may exceed a certain limit may in combination make a thermal energy available which which could ignite an explosive atmosphere. In order to comply with the IS requirements, a circuit must include components which ensure that such combinations do not arise (which a given degree of certainty). This may involve limiting the amount of capacitance or thermal resistance, as well as limiting voltage and power which can be applied to such capacitance or thermal resistance.

Examples of international standards for intrinsic safety (IS) are IEC 60079-0 and IEC 60079-11, herewith incorporated by reference. These standards utilizes three levels of protection, ia', ib' and ic', which attempt to balance the probability of an explosive atmosphere being present against the probability of an ignition capable situation occurring. The level ia' offers the highest level of protection and is generally considered as being adequately safe for use in the most hazardous locations (Zone 0) because the possibility of two 'faults' and a factor of safety of 1.5 is considered in the assessment of safety. The level ib', which is adequately safe with one fault and a factor of safety of 1.5 is considered safe for use in less frequently hazardous areas (Zone 1), and the level ic' is assessed in 'normal operation' with a unity factor of safety is generally acceptable in infrequently hazardous areas (Zone 2).

The electrical barrier of the present invention acts as a "return IS barrier", and protects the inherently intrinsically safe system from being compromised by any non-IS circuitry in the RLG circuitry. This is contrary to a "conventional" IS barrier, which serves to restrict voltage, current and/or power delivered by a non-IS power supply to an IS circuit. The barrier of the present invention only ensures that e.g. power or voltage which is not compatible with IS requirements will be prevented from reaching an intrinsically safe system connected to the RLG.

As an example of non-IS circuitry which may be present in the RLG circuitry is an energy store, e.g. a capacitor, having an energy storage capacity at an operating voltage which is incompatible with IS requirements. Such an energy store may be required in order to temporarily provide more power than what is available from the power supply. Such increased power may be required during a limited portion of a measurement cycle, for example to generate the transmit signal. An example of a power supply with relatively low power is a two-wire control loop, e.g. a 4-20 mA control loop.

According to embodiments of the invention, the electrical barrier may include at least one diode connected in series between the RLG circuitry and the two-wire interface, thereby preventing energy from the RLG circuitry from reaching the intrinsically safe system. The electrical barrier may further include at least one diode connected in parallel between lines of the two-wire interface, thereby preventing negative voltages at the two-wire interface. In order to limit a current and/or a power that the diodes are subject to, the electrical barrier may include at least one fuse and/or one resistor connected in series between the RLG circuitry and the two-wire interface.

According to one embodiment, the signal propagation device may be a directional antenna, in which case the first signal passage may include a waveguide with a dielectric filling member made of a structurally strong and temperature resistant material.

According to another embodiment, the signal propagation device is a transmission line probe, in which case the first signal passage may include an electrical filter/barrier circuit having an input coupled to the RLG circuitry and an output coupled to the transmission line probe, the electrical filter/barrier circuit exhibiting a series capacitance for non-conductively coupling the RLG circuitry to the transmission line probe.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
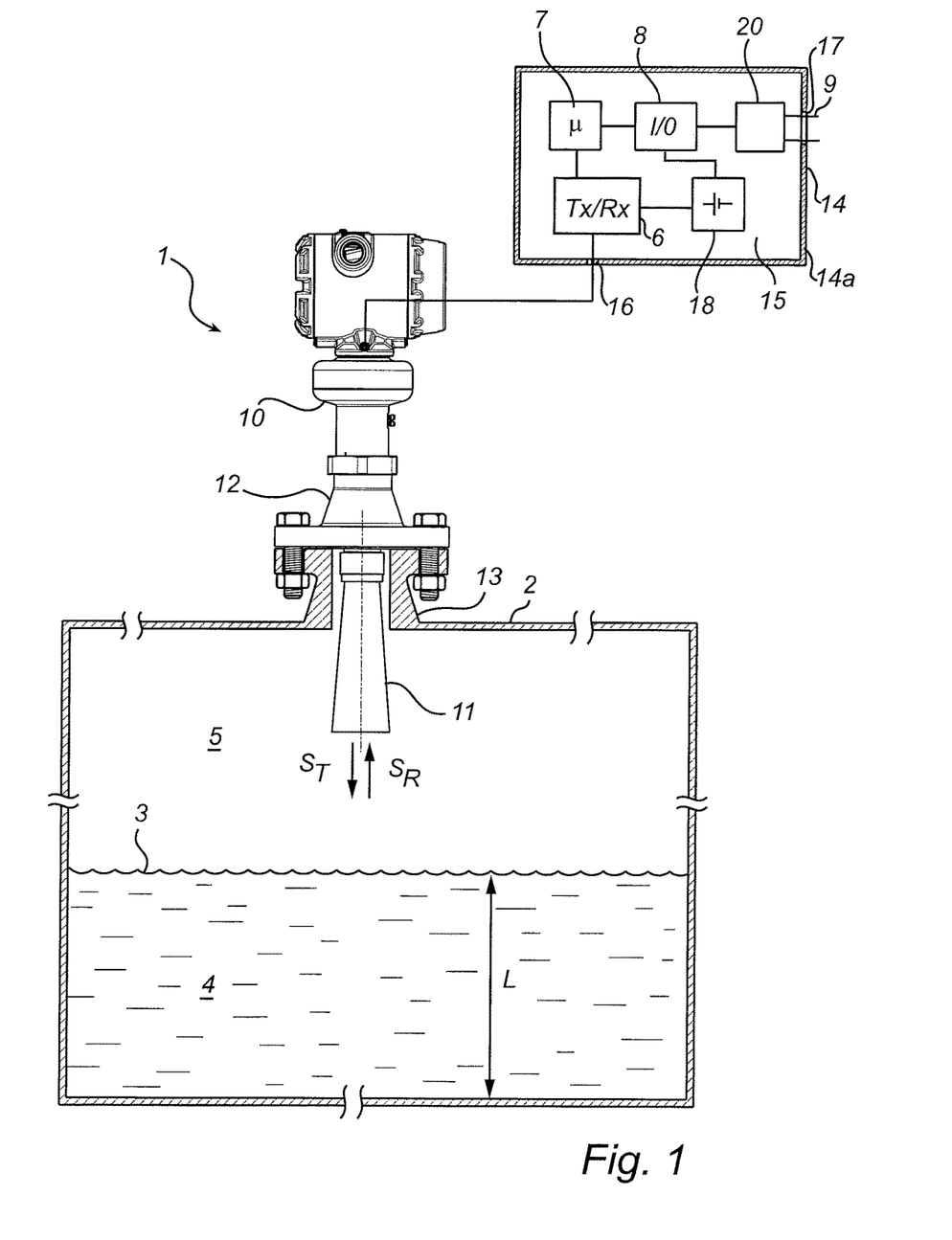
FIG. 1 is a schematic view of an non-contact RLG according to an embodiment of the present invention.

FIG. 1 shows a schematic drawing of a radar level gauge (RLG) 1 according to an embodiment of the present invention. The RLG 1 is mounted on a tank 2, and arranged to perform measurements of a process variable such as the level L of an interface 3 between two materials 4, 5 in the tank 2. Typically, the first material is a liquid 4 stored in the tank, e.g. gasoline, while the second material is air or other atmosphere 5 in the tank. In some applications, the tank is a very large metal tank (diameter in the order of ten meters).

The radar level gauge 1 includes transceiver circuitry 6, processing circuitry 7 and a signal/power circuitry 8. The transceiver circuitry 6 is configured to generate and transmit an electromagnetic transmit signal $S_T$ and receive an electromagnetic return signal SR.

The RLG circuitry, i.e. the transceiver circuitry 6, processing circuitry 7 and a signal/power circuitry 8, is arranged in a measurement unit (MU) 10 mounted to a tank connection 12 made of a metal material, typically steel, which is adapted to be securely fitted (e.g. bolted or welded) to a tank flange 13. The tank connection 12 is adapted to provide a passage (preferably pressure sealed) for electromagnetic signals through the wall of the tank, which passage connects the transceiver circuitry 6 with a signal propagation device, here a directional antenna in the form of an antenna horn 11 extending into the tank 2. The antenna 11 is arranged to act as an adapter, transmitting free propagating electromagnetic waves into the tank 2 to be reflected by the interface, here the surface 3 of the product 4 in the tank 2. An RLG with a directional antenna is often referred to as a non-contact radar (NCR) level gauge.

Based on a relationship between the transmit signal $S_T$ and the reflected return signal SR, the processing circuitry can determine the distance between a reference position (such as the passage between the outside and the inside of the tank) and the surface 3 of the product 4, whereby the filling level L can be deduced. It should be noted that, although a tank 2 containing a single product 4 is discussed herein, the distance to any material interface along the probe can be measured in a similar manner.

The transmit signal is a high frequency signal, with a frequency greater than 1 GHz, and is typically centered around 6 GHz or 26 GHz. It may be a continuous signal with varying frequency (frequency modulated continuous wave, FMCW), or it can be a modulated pulse (pulsed radar). Also other types of transmit signals are possible.

The signal/power circuitry 8 is configured to allow communicating measurement data externally of the RLG 1, and also to receive operating power. The circuitry 8 is connected to an intrinsically safe system 9, e.g. a "Ex-ia"-system according to the IEC 60079-11 standard. Here, the system is a two-wire 4-20 mA loop 9. The current in the loop may correspond to an analogue measurement value (e.g. indicating the filling level L). Alternatively, digital data may be sent across the two-wire loop, using an appropriate protocol such as HART.

The RLG circuitry 6, 7, 8 is enclosed in an explosion proof (sometimes also referred to as flame proof) compartment 15 enclosed by a housing 14 of the measurement unit (MU) 10. The explosion proof compartment 15 may need to fulfill certain requirements, such as those detailed by international standard IEC 60079-1 or similar standards. For example, the compartment may comply with the Ex-d requirements of the IEC 60079-1 standard However, the RLG circuitry 6, 7, 8 may be non-IS, i.e. is not necessarily compatible with relevant intrinsic safety requirements. For example, the RLG circuitry may include an energy store 18, configured to store energy provided by the signal/power circuitry 8 in order to periodically allow an increased power consumption.

The IS requirements stipulate a series of conditions which need to be met, including a restriction of capacitance at a given voltage level. For example, an Ex-ia circuit may not include a capacitance of at least 100 µF with a voltage across the capacitance of at least 5 V, a capacitance of at least 25 µF with a voltage across the capacitance of at least 6.5 V, a capacitance of at least 10 µF with a voltage across the capacitance of at least 8 V, a capacitance of at least 2 µF with a voltage across the capacitance of at least 12 V, nor a capacitance of at least 0.5 µF with a voltage across the capacitance of at least 16 V.

Two signal passages 16, 17 are formed in the wall 14a of the housing 14, connecting the explosion proof compartment 15 to the exterior. Both passages are explosion proof, e.g. need to comply with the same explosion proof requirements as the compartment 15. For example, the passages may comply with Ex-d requirements.

The first signal passage 16 (or feed through) is located between the MU 10 and the tank connection 12. The first passage 16 provides a transmission line for high frequency (here microwave) measuring signals between the RLG circuitry 6, 7, 8 and the signal propagation device, in this case the antenna 11. The first passage should also be designed such that transmitted microwave signals comply with the intrinsic safety requirements. As an example, the first passage can be designed to comply with the requirements defined in clause 6.6.1 of IEC 60079-0. Examples of explosion proof passages allowing compliant transmission of microwave signals will be discussed below, with reference specifically to FIGS. 2 and 5.

The second signal passage 17 is located at an accessible point of the housing 14, and provides an electrical feedthrough, i.e. a conductive electrical two-wire interface through the housing wall 14a for connecting the two-wire control loop 9 (or to any other intrinsically safe system) to the RLG 1.

Electrical feedthroughs which comply with explosion proof requirements (Ex-d) are available in the art, and may include for example contact pins embedded (cast) in the compartment wall. However, it is also necessary to ensure that connection of the potentially non-IS RLG circuitry 6, 7, 8 does not compromise the intrinsic safety of the system 9 (e.g. the control loop).

For this purpose, the RLG 1 further comprises an electrical barrier 20 connected between the signal/power circuitry 8 and the conductive electrical interface. This electrical barrier 20 is configured to prevent energy or voltages in the RLG circuitry 6, 7, 8 from compromising the intrinsic safety of the intrinsically safe system 9 connected to the RLG. In the illustrated example, this barrier 20 is indicated as being located in the compartment 15, but it may also be possible to provide the barrier 20 externally to the compartment 15.

Figure 2A:
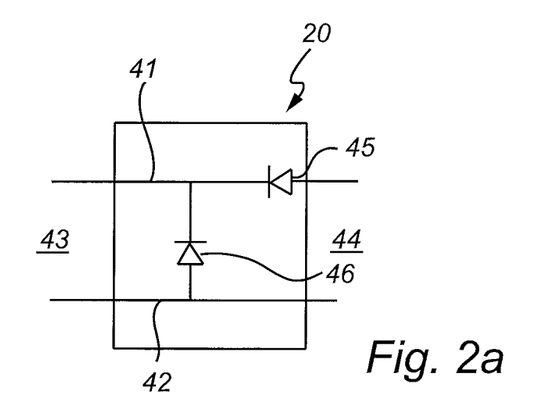
FIGS. 2a and 2b are more detailed block diagrams of examples of the electrical barrier in FIG. 1.

FIGS. 2a and 2b provide two simple examples of such an electrical barrier 20. As shown in FIG. 2a, the barrier 20 has two lines 41, 42 which extend between a first side 43 for connection to the potentially non-IS RLG circuitry 6, 7, 8, and a second side 44 for connection to the intrinsically safe system 9. A first voltage regulating component, here including a first set of serially diodes 45, is provided on one of the lines 41, and a second voltage regulating component, here a second set of serially connected diodes 46, is connected between the lines 41, 42. Depending on the characteristics of the RLG circuitry, e.g. the amount of energy storage, and the type of diodes used, it may be appropriate that each set includes one diode, two diodes, three diodes, or more diodes.

Figure 2B:
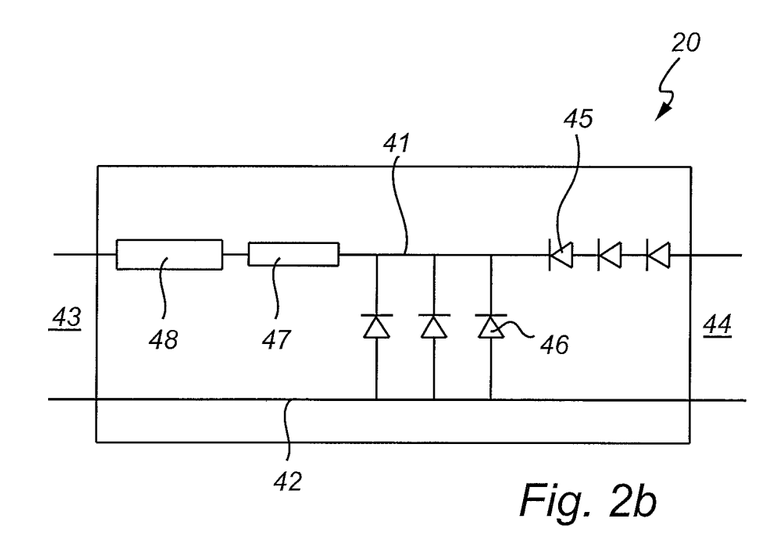

In FIG. 2b each set of diodes 45, 46 includes three diodes. Further, the barrier 20 in FIG. 2b also includes a resistor 47 and a fuse 48, both serially connected with the first set of diodes 46. The resistor 47 will serve to further limit the return current, and thus the power/transient potentially seen by the protective diodes. If a fuse 48 is provided, the resistor 47 may be redundant, and only required to limit the current through the fuse to comply with the breaking capacity of the fuse.

Figure 3:
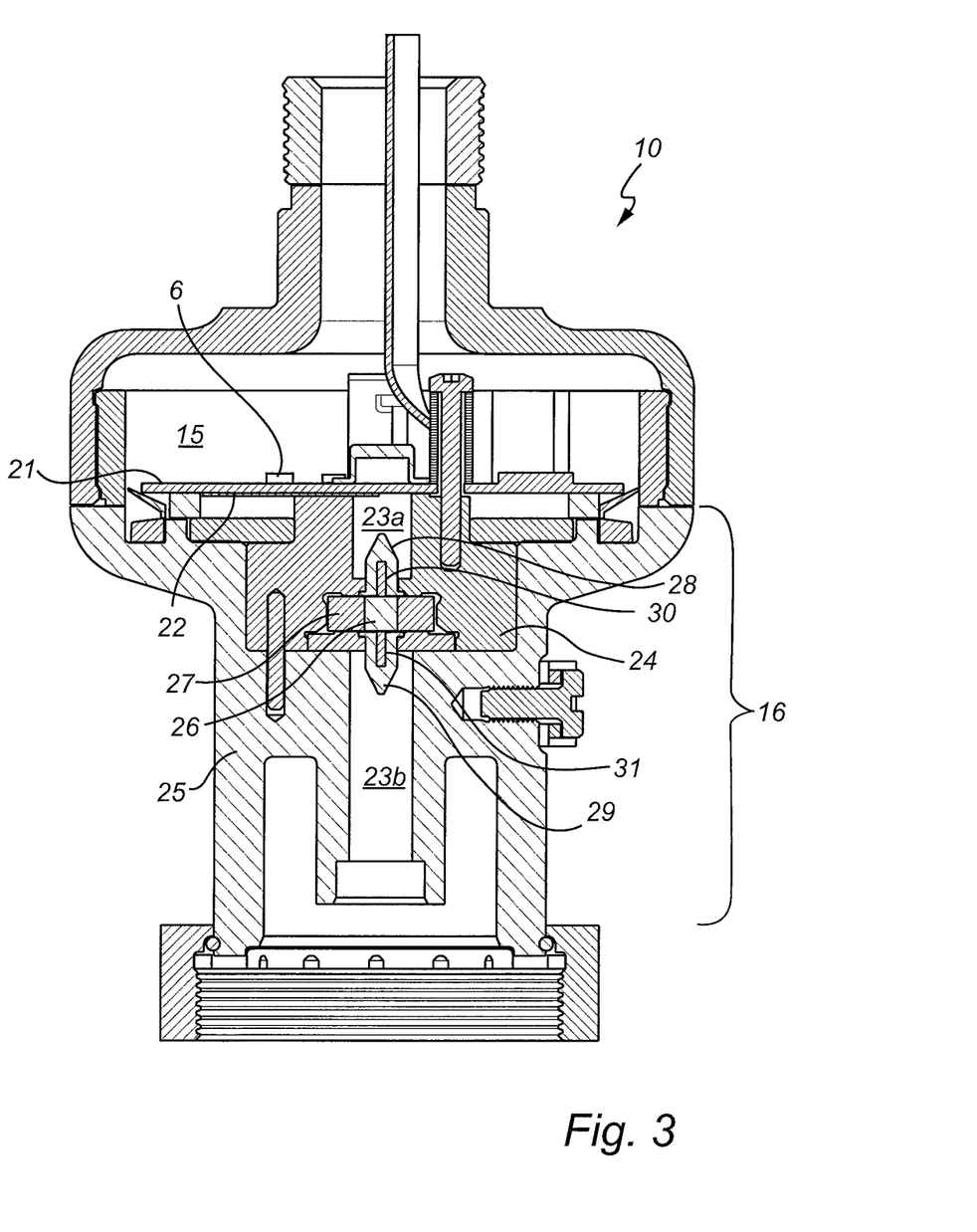
FIG. 3 is a more detailed sectional view of the tank feed through structure in FIG. 1.

Returning to the first explosion proof passage 16 in the wall 14a of the measurement unit 14, FIG. 3 shows the measurement unit 14 in more detail. A more complete description of such a measurement unit can be found in co-pending U.S. patent application Ser. No. 15/204,194, hereby incorporated by reference, but a brief description of relevant parts will be provided below.

In FIG. 3, the transceiver circuitry 6 is schematically illustrated as components arranged on a circuit board 21 in the compartment 15. A feeder arrangement 22 is arranged to feed the transmit signal from the transceiver circuitry 6 to a hollow waveguide 23a, 23b connected to the antenna 11 via the passage 16, also referred to as a feed through.

The feed-through 16 here includes a first conductive waveguide forming member 24 forming an upper portion 23a of the hollow waveguide, and a second conductive waveguide forming member 25 forming a lower portion 23b of the hollow waveguide. Between the waveguide portions 23a, 23b is arranged a dielectric plug 26, here a glass plug fused into a cylindrical hole in a metal disc 27. On either side of the dielectric plug 26 are arranged dielectric impedance matching members 28, 29, having metal pins 30, 31 embedded in the dielectric material. The members 28, 29 serve to match the impedance of the glass plug 26 with that of the hollow waveguide portions 23a, 23b.

Figure 4:
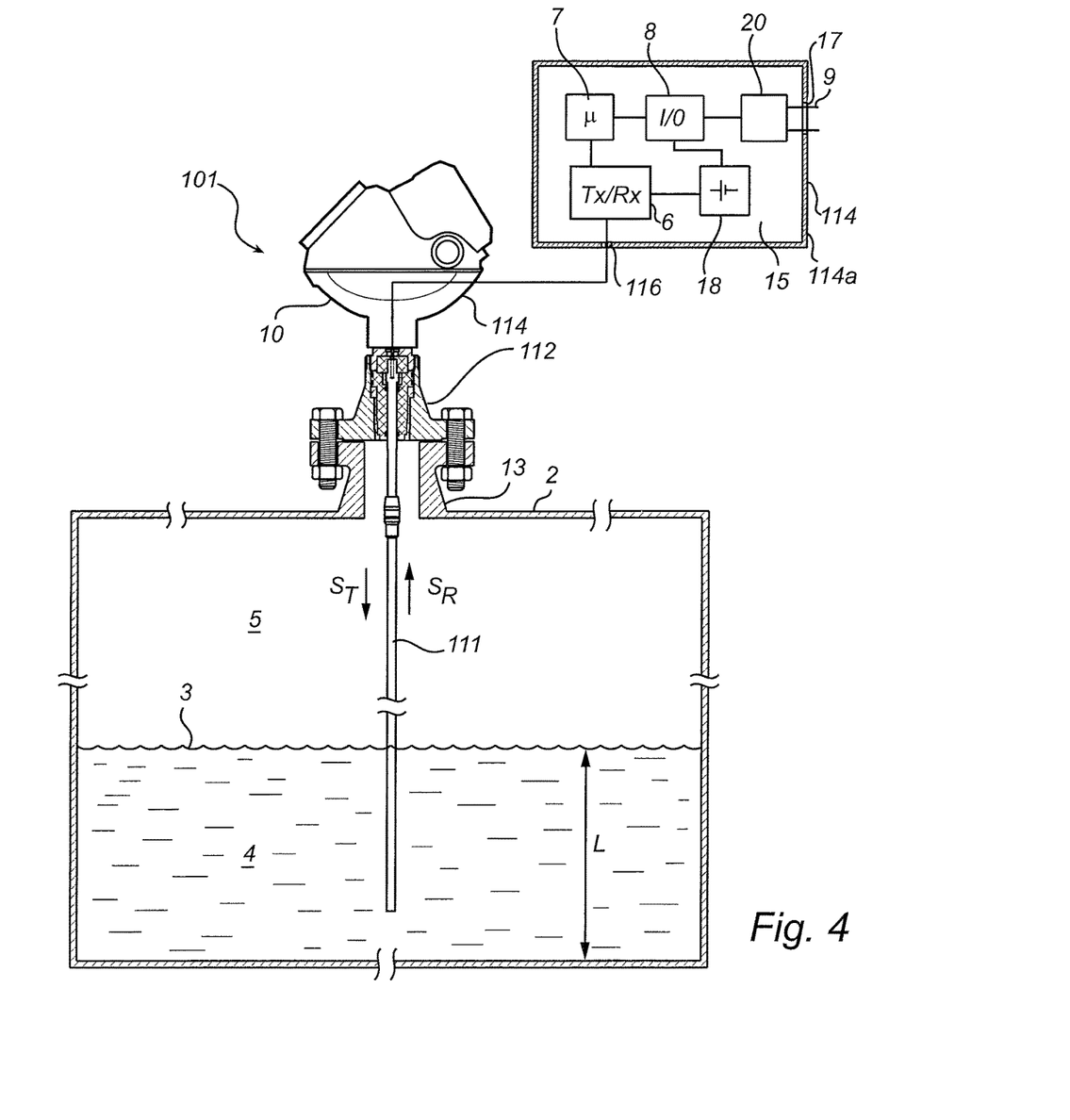
FIG. 4 is a schematic view of an GWR RLG according to an embodiment of the present invention.

It is noted that the present invention may also be implemented in a guided wave radar (GWR) level gauge, as schematically illustrated in FIG. 4. Similar to the RLG in FIG. 1, the RLG in FIG. 4 comprises a housing 114 enclosing transceiver circuitry 6, processing circuitry 7 and communication interface 8. However, in this case, the signal propagation device is a transmission line probe 111 extending from the tank connection 112 down into the product in the tank. Typically, the probe 111 is attached to the bottom of the tank, or alternatively a weight is suspended by the probe in order to keep it vertical.

The operation of the RLG 101 is similar to that of the LRG 1 in FIG. 1, but here the transmit signal and return signal propagate along the probe 111. The surface 3 of the product 4 will create an impedance transition along the probe, which in turn will cause a reflection of the transmit signal, and the filling level can be determined as discussed above. Just as above, the measuring principle may be FMCW or pulsed radar.

Figure 5:
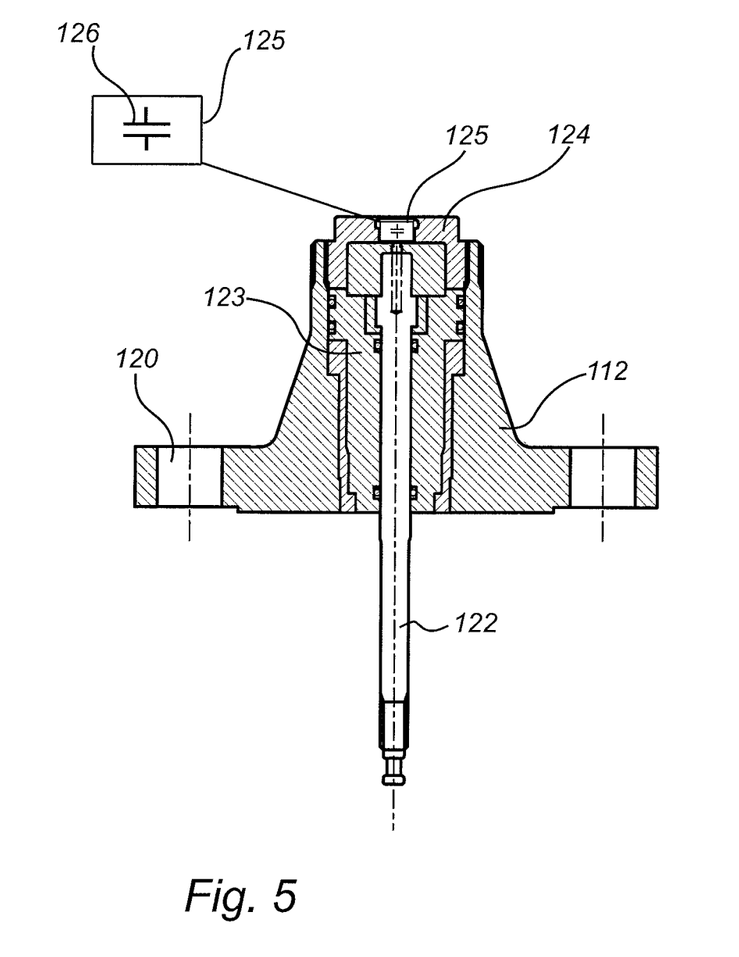
FIG. 5 is a more detailed sectional view of the tank feed through structure in FIG. 4.

The housing 114 is mounted to a tank connection 112, which is shown in more detail in FIG. 5. The tank connection 112 is adapted to be mounted to the tank flange 13. A coupling arrangement is arranged in the opening of the tank connection 112, and includes a central probe connector 122 surrounded by one or several dielectric sleeves 123. The coupling arrangement is held in place by a fastening member 124, e.g. a threaded cap. The feed through structure 112 and the coupling arrangement 122, 123, 124 provides a sealed passage for the transmit and return signals through the tank wall.

Similar to the RLG 1 in FIG. 1, the RLG 101 in FIG. 4 has a second signal passage 116 in the form of a tank feed through, which in this case can be an explosion proof (Ex-d) coaxial connection in the housing wall 114a. As mentioned above, a person skilled in the art will understand how to provide an explosion proof electrically conductive feed through.

However, in order to ensure intrinsic safety also in this case, it is necessary to avoid a conductive electrical coupling between the probe connector 122 and the RLG circuitry. For this reason, an electrical filter 125 is arranged at the top cap 124.

A complete description of such an electrical filter is provided in co-pending U.S. patent application Ser. No. 15/204,177, hereby incorporated by reference. In brief, the filter 125 may include a coupling capacitor 126 with a relatively small capacitance, for example less than 10 pF. Due to the small capacitance, the coupling capacitor 126 will effectively suppress low frequency electrical signals from passing through the filter 125. By suppressing low frequency, intrinsic safety can be ensured by merely keeping the amplitude of the microwave signal below a given threshold. In other words, the provision of the electrical filter 125 ensures that the possible low frequency signals originating from the RLG circuitry will not be capable of igniting a flammable substance present in the tank 3. The high frequency signals passing the electrical filter 125 must of course be power limited and must comply with the rules related to intrinsic safety (IS).

As further discussed in U.S. patent application Ser. No. 15/204,177, the coupling capacitor 126 may simply comprise a dielectric structure arranged between first and second capacitor electrodes. The dielectric structure may, for example, be a circuit board or a portion of the measurement electronics unit housing 25. Alternatively, first and second capacitor electrodes are provided on the same side of an dielectric structure, and are covered by a dielectric insulation coating. In yet another design, first and second capacitor electrodes are arranged in a partial coaxial configuration in a dielectric structure.

With a simple electrical filter 125 provided by the small capacitance coupling capacitor 126, high frequency signals (such as 1 GHz) can pass, while low frequency signals meet a non-connection. For instance 250 VAC at 50-60 Hz would cause less than 1 pA through 5 pF while at least around 10 mA would be required for ignition of hydrogen/air mixture. Accordingly, even the simple electrical filter in FIG. 2 can provide for intrinsic safety at the output of the measurement electronics unit 6. With coupling capacitor configurations such as those described above, the electrical low-frequency separation can be made infallible, which obviates the need for component duplication (or triplication) and/or expensive and bulky barrier components.

The person skilled in the art realizes that the present invention by no means is limited to the preferred embodiments described above. On the contrary, many modifications and variations are possible within the scope of the appended claims. For example, the explosion proof passages or feed-throughs may be realized differently than in the given examples. Further, the details of the RLG circuitry, and the reason for incompatibility with IS requirements may vary, and not necessarily be associated with energy storage.

What is claimed is:

1. A radar level gauge for determining the filling level of product in a tank, said gauge comprising:
    a housing with a housing wall enclosing a compartment providing explosion proof protection;
    RLG circuitry located inside compartment, said circuitry in use having an available electrical and/or thermal energy incompatible with intrinsic safety requirements;
    a signal propagation device located outside said compartment, said signal propagation device being adapted to direct a microwave transmit signal toward said product and return reflections thereof from a surface of said product;
    an explosion proof first signal passage in said housing wall, said first signal passage providing a transmission line for said microwave transmit signal between said RLG circuitry and said signal propagation device;
    an explosion proof second signal passage in said housing wall, said second signal passage providing a two-wire interface for electrically conductively connecting said radar level gauge to an intrinsically safe system located externally of said radar level gauge, to provide at least one of: communication between said radar level gauge and said intrinsically safe system, and power supply to said RLG circuitry; and
    an electrical barrier connected between said RLG circuitry and the two-wire interface, said electrical barrier preventing energy or voltages in said RLG circuitry from compromising the intrinsic safety of an intrinsically safe system connected to the two-wire interface.

2. The radar level gauge according to claim 1, wherein said RLG circuitry includes at least one energy store having an energy storage capacity which is incompatible with IS requirements at a voltage applied to the storage capacity.

3. The radar level gauge according to claim 1, wherein said RLG circuitry includes at least one energy store having an energy storage capacity greater than 600 μJ.

4. The radar level gauge according to claim 1, wherein said RLG circuitry includes one of:
    a capacitance of at least 100 μF with a voltage across the capacitance of at least 5 V,
    a capacitance of at least 25 μF with a voltage across the capacitance of at least 6.5 V,
    a capacitance of at least 10 μF with a voltage across the capacitance of at least 8 V,
    a capacitance of at least 2 μF with a voltage across the capacitance of at least 12 V, and
    a capacitance of at least 0.5 μF with a voltage across the capacitance of at least 16 V.

5. The radar level gauge according to claim 1, wherein the electrical barrier includes at least one first diode connected in series between the RLG circuitry and the two-wire interface, thereby preventing energy from said RLG circuitry from reaching an intrinsically safe system connected the two-wire interface.

6. The radar level gauge according to claim 5, wherein the electrical barrier includes at least one fuse and/or one resistor limiting a current and/or a power said at least one first diode is subjected to.

7. The radar level gauge according to claim 1, wherein the electrical barrier includes at least one second diode connected in parallel between lines of the two-wire interface, thereby preventing negative voltages at the two-wire interface.

8. The radar level gauge according to claim 7, wherein the electrical barrier includes at least one fuse and/or one resistor limiting a current and/or a power said at least one second diode is subjected to.

9. The radar level gauge according to claim 1, wherein said first explosion proof passage is adapted to ensure that high frequency energy transmitted through the first passage comply with requirements defined in clause 6.6.1 of IEC 60079-0.

10. The radar level gauge according to claim 1, wherein said compartment and said first and second passages comply with the Ex-d requirements of IEC 60079-1.

11. The radar level gauge according to claim 1, wherein said intrinsically safe system complies with the Ex-ia requirements of IEC 60079-11.

12. The radar level gauge according to claim 1, wherein said signal propagation device is a directional antenna.

13. The radar level gauge according to claim 12, wherein said first signal passage includes a waveguide with a dielectric filling member made of a structurally strong and temperature resistant material.

14. The radar level gauge according to claim 1, wherein said signal propagation device is a transmission line probe.

15. The radar level gauge according to claim 14, wherein said first signal passage includes an electrical filter circuit having an input coupled to the RLG circuitry and an output coupled to the transmission line probe, the electrical filter circuit exhibiting a series capacitance for non-conductively coupling the RLG circuitry to the transmission line probe.

16. The radar level gauge according to claim 1, wherein the transmit signal has a frequency greater than 1 GHz.

17. The radar level gauge according to claim 1, wherein said RLG circuitry includes:
    transceiver circuitry configured to generate and transmit an electromagnetic transmit signal $S_T$ and receive an electromagnetic return signal reflected from the tank,
    processing circuitry configured to determine the distance between a reference position and the surface of the product based on a relationship between the transmit signal and the return signal, and
    signal/power circuitry configured to receive operating power and communicate measurement data.

* * * * *